(12) United States Patent
Lin

(10) Patent No.: US 6,192,148 B1
(45) Date of Patent: Feb. 20, 2001

(54) METHOD FOR DETERMINING TO SKIP MACROBLOCKS IN ENCODING VIDEO

(75) Inventor: Rehn-Lieh Lin, Hsinchu (TW)

(73) Assignee: Winbond Electronics Corp. (TW)

(*) Notice: Under 35 U.S.C. 154(b), the term of this patent shall be extended for 0 days.

(21) Appl. No.: 09/186,469

(22) Filed: Nov. 5, 1998

(51) Int. Cl.[7] .................................................. G06K 9/00
(52) U.S. Cl. ................................... 382/166; 382/235
(58) Field of Search ..................... 382/166, 167, 382/163, 165, 168, 232, 239, 242, 245, 246, 247, 248, 251, 235

(56) References Cited

U.S. PATENT DOCUMENTS

| 2,269,070 | * | 1/1942 | White | 177/7 |
| 5,978,029 | * | 11/1999 | Boice et al. | 348/412 |
| 5,984,512 | * | 11/1999 | Jones et al. | 364/514 |

* cited by examiner

Primary Examiner—Bijan Tadayon
Assistant Examiner—Seyed Azarian
(74) Attorney, Agent, or Firm—Proskauer Rose LLP

(57) ABSTRACT

A method is provided for encoding video pictures. A sequence of video pictures is obtained. The luminance pixel data of a current $i^{th}$ macroblock is motion estimated to produce a motion vector and the luminance mean absolute difference between the luminance pixel data of the current $i^{th}$ macroblock and the luminance data of the prediction macroblock. If the motion vector is zero and the luminance mean absolute difference is below a first threshold then the chrominance mean absolute difference is generated for the current $i^{th}$ macroblock and the prediction macroblock. If the chrominance mean absolute difference is less than a second threshold, then the macroblock is skipped. Otherwise, the prediction error macroblock is formed and then spatially encoded. By determining whether or not to skip the macroblock prior to spatial encoding, processing resources are conserved in a processor encoder implementation.

3 Claims, 2 Drawing Sheets

METHOD FOR DETERMINING TO SKIP MACROBLOCKS IN ENCODING VIDEO

FIELD OF THE INVENTION

The present application pertains to encoding video.

BACKGROUND OF THE INVENTION

Several standards are available for encoding and decoding video to reduce the bandwidth of the video such as H.261, H.262, H.263, MPEG-1 and MPEG-2. These standards typically utilize both temporal and spatial compression. A to be encoded video picture (field or frame) is divided into non-overlapping macroblocks, where each macroblock is a two dimensional array of luminance blocks and each chrominance block overlapping thereon. Each luminance or chrominance block, in turn, is an 8×8 array of (luminance or chrominance) pixel data. In temporal encoding, one or more reference pictures are designated for each to be encoded video picture. For each macroblock of the to be temporally encoded video picture, a search is carried out, e.g., using a block matching technique, to identify a prediction macroblock in a reference picture which best matches the macroblock of the to be encoded picture. This is referred to as motion estimation. The prediction macroblock is identified by a motion vector which indicates a spatial (pixel row and column) and temporal (picture of the sequence) offset from the macroblock of the to be encoded picture to the prediction macroblock. A prediction error macroblock is then formed by subtracting the macroblock of the to be temporally encoded picture from the prediction macroblock. The individual blocks of the prediction error macroblock are then spatially encoded.

Spatial encoding involves the steps of discrete cosine transforming (orthogonally transforming) a block, quantizing the transformed block, and entropy encoding the quantized block (e.g., run-level encoding the quantized block and variable length encoding the run-level encoded block). The encoded data thus produced is formatted into a bitstream including other header, flag and parameter data.

According to the MPEG-2 standard, it is not strictly necessary to encode each macroblock. Rather, if a prediction error macroblock has a zero spatial offset motion vector, and only zero valued quantized block data, no data need be provided in the bitstream for the macroblock. Instead, indicator information is placed in the bitstream to indicate that a macroblock has been skipped.

It is an object of the present invention to provide an improved determination process for determining whether or not to skip a macroblock.

SUMMARY OF THE INVENTION

This and other objects is achieved by the present invention. According to one embodiment, a method is provided for encoding video pictures according to the following steps: (a) A sequence of video pictures is obtained. (b) Certain ones of the pictures of the sequence are designated for predictive encoding and one or more of the pictures of the sequence are designated as reference pictures for each picture designated for predictive encoding. (c) A picture designated for predictive encoding is divided into macroblocks. (d) The following steps are then iterated once for each $i^{th}$ macroblock of the picture designated for encoding: (e) The $i^{th}$ macroblock is motion estimated using only the luminance blocks of the $i^{th}$ macroblock. This produces a motion vector, indicating the temporal and spatial offset from the $i^{th}$ macroblock to a prediction macroblock in a designated reference picture, and the mean absolute difference of the luminance blocks of the $i^{th}$ macroblock and the luminance pixels of the prediction macroblock. The mean absolute difference is generated by evaluating:

$$\sum_{x=1}^{j} \sum_{y=1}^{k} |P_i^Y[x,y] - MB_i^Y[x,y]|$$

where $P^Y_i$ is the luminance pixel data of the prediction macroblock for the $i^{th}$ macroblock, $MB^Y_i$ is the luminance pixel data of the $i^{th}$ macroblock and j and k are the number of rows and columns of luminance pixel data in a macroblock, respectively. (f) If the motion vector is zero and the mean absolute difference is below a first threshold, then the following steps (g), (h) and (i) are performed. Otherwise, only steps (j), (k), (l), (m) and (n) are performed. (g) The chrominance mean absolute difference between the chrominance blocks of the $i^{th}$ macroblock and the prediction macroblock is generated by evaluating:

$$\sum_{x=1}^{a} \sum_{y=1}^{b} |P_i^{Cr}[x,y] - MB_i^{Cr}[x,y]| + \sum_{x=1}^{a} \sum_{y=1}^{b} |P_i^{Cb}[x,y] - MB_i^{Cb}[x,y]|$$

where $P^{Cr}_i$ is the red chrominance pixel data of the prediction macroblock for the $i^{th}$ macroblock, $MB^{Cr}_i$ is the red chrominance pixel data of the $i^{th}$ macroblock, $P^{Cb}_i$ is the blue chrominance pixel data of the prediction macroblock for the $i^{th}$ macroblock, $MB^{Cb}_i$ is the blue chrominance pixel data of the $i^{th}$ macroblock and a and b are the number of rows and columns of red and blue chrominance pixel data in a macroblock, respectively. (h) If the chrominance mean absolute difference is less than a second threshold, then the following step (i) is performed. Otherwise, steps (j), (k), (l), (m) and (n) are performed. (i) An indication is inserted into the bitstream indicating that the $i^{th}$ macroblock is skipped. No further steps (namely, (j), (k), (l), (m) and (n)) are performed for the $i^{th}$ macroblock. On the other hand, if step (i) is not performed for the $i^{th}$ macroblock, the following steps (j), (k), (l), (m) and (n) are performed for the $i^{th}$ macroblock: (j) The luminance and chrominance blocks of the $i^{th}$ macroblock are subtracted from the prediction macroblock to form the prediction error macroblock for the $i^{th}$ macroblock. (k) Each block of the prediction error macroblock for the $i^{th}$ macroblock is then orthogonally transformed. (l) Each transformed block of the prediction error macroblock for the $i^{th}$ macroblock is quantized. (m) Each quantized block of the prediction error macroblock for the $i^{th}$ macroblock and the motion vector are entropy encoded. (n) The entropy encoded blocks of the prediction error macroblock and motion vector for the $i^{th}$ macroblock are then inserted into the encoded bitstream. Thus steps (j), (k), (l), (m) and (n) are not performed for the $i^{th}$ macroblock if step (i) is performed for the $i^{th}$ macroblock.

According to another embodiment, an encoding system is provided including a memory for temporarily storing pictures pending encoding and reference pictures, and a processor for performing the above steps.

The technique according to the invention is amenable for an encoder implemented as software executing on one or more processors. Specifically, the decision of whether or not to skip a macroblock is performed prior to the spatial encoding steps of orthogonally transforming, quantizing and entropy encoding. As orthogonal transforms are highly computationally intensive, a dramatic savings in processing time is achieved for a processor implementation, which additional time can be used to perform other encoding or non-encoding processing tasks.

DETAILED DESCRIPTION OF THE INVENTION

This invention is illustrated herein for an H.263 compatible video encoder. However, those skilled in the art will appreciate the applicability of the invention to other types of predictive encoders, such as H.261, H.262, MPEG-1 and MPEG-2 video encoders.

Figure 1:
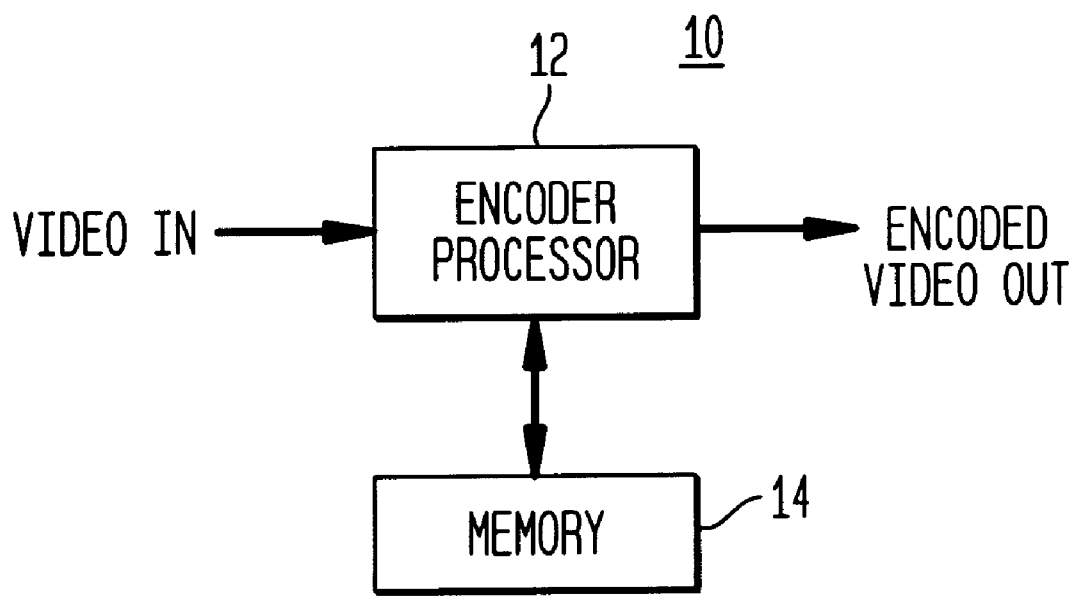
FIG. 1 shows an encoder according to an embodiment of the present invention.

FIG. 1 shows an encoding system 10 according to the present invention. The system 10 includes an encoder processor 12, such as the W9960CF Video Conferencing Video Codec™ distributed by Winbond Electronics Corporation, N.A., located in San Jose, Calif. This system 10 also includes a memory 14 which may be implemented using multiple high speed SDRAM circuits, such as the W986408AH-10 SDRAMs distributed by Winbond Electronics Corporation, N.A. Video pictures of a sequence are sequentially inputted to the processor 12 for encoding. These video pictures may be initially generated by a camera (having a photo tube, CCD or CMOS photo sensor). During encoding, one or more pictures may be stored in the memory 14. An encoded bitstream containing the encoded video pictures is outputted from the encoder processor 12. Encoded pictures may be transferred to a (storage or transmission) medium such as a magnetic or optical disk, memory, local area network, telephone network, cable network, satellite network, etc. Illustratively, the encoding system 10 is designed for use with a personal computer that communicates two way video via a modem connected to a telephone network. In such a case, the encoding system 10 may be contained in the same housing as the camera attached to the computer. The encoding system 10 can communicate the encoded video via a USB (universal serial bus) to a USB port of the computer.

Figure 2:
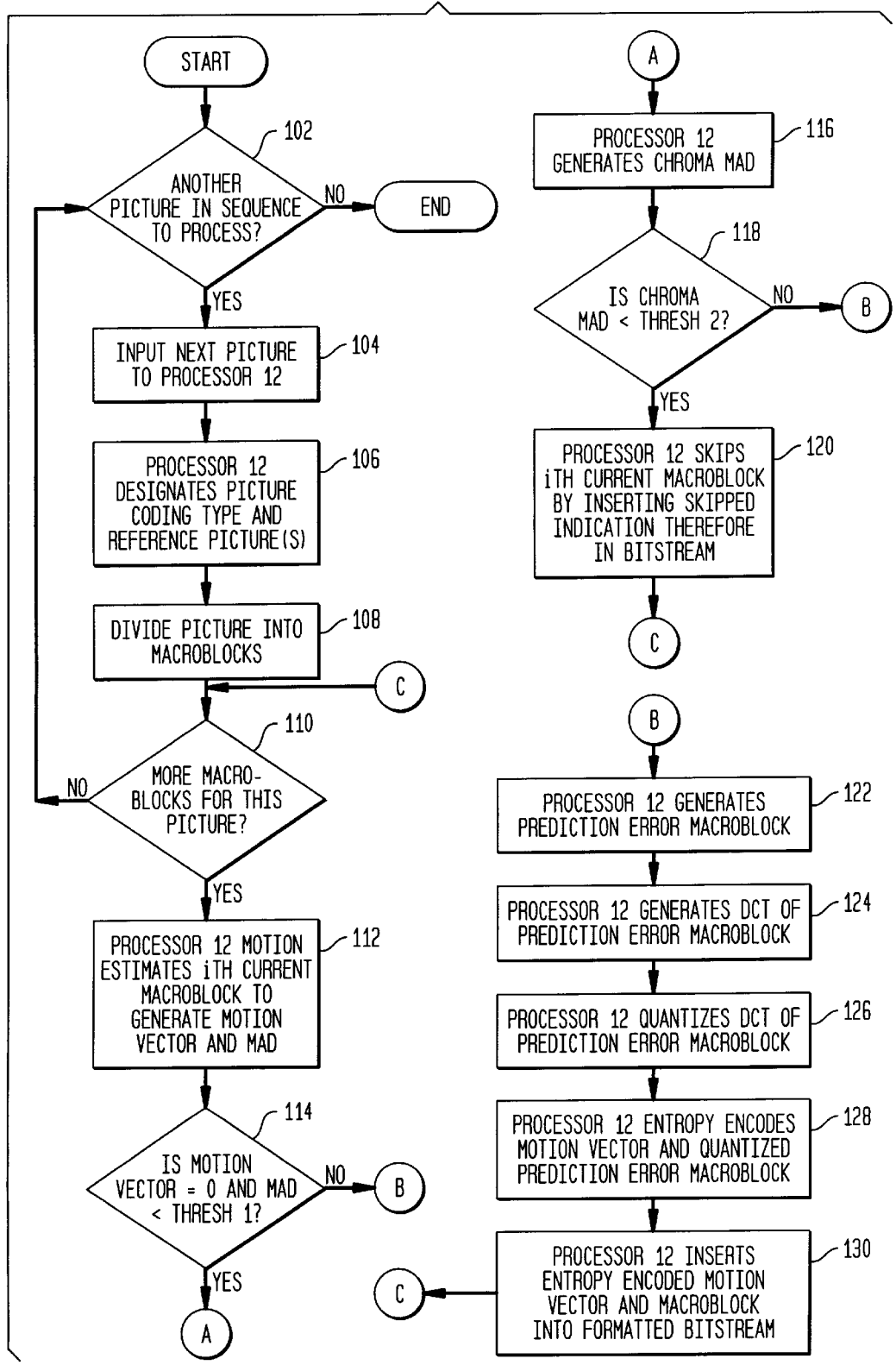
FIG. 2 shows a flowchart illustrating an encoding process executed by the encoder according to an embodiment of the present invention.

FIG. 2 illustrates a flow chart of a an encoding process carried out by the encoding system 10. Again, the process illustratively is an H.263 compatible encoding process, although other encoding process may be carried out by the encoding system 10 through suitable substitution of program instructions executed by the processor 12. Some of the well known encoding steps have been omitted for sake of brevity.

In a first step 102, the processor 12 determines if there is another picture of the sequence of pictures to be received. If not, the processor 12 may stop execution. If another picture is available, the processor 12 executes step 104 according to which the next picture (in presentation order) is inputted to the processor 12. This picture may be stored in a buffer of the memory 14 pending processing.

Next, in step 106, the processor 12 determines the picture coding type for the picture. Illustratively, there are three types of pictures, namely, I, P and B. All of the macroblocks in I pictures are only spatially encoded-no macroblocks of an I picture are temporally encoded. Rather, each block of each macroblock in an I picture is merely discrete cosine transformed, quantized and entropy encoded. The processing steps for selecting spatial only encoding for certain macroblocks, and for performing such encoding by the processor 12, have been omitted for sake of brevity. Macroblocks in P pictures are preferably both temporally and spatially encoded. The reference picture for a P picture is the immediately preceding I or P picture in the sequence of pictures. Occasionally, a macroblock in a P picture is only spatially encoded, if an adequate prediction cannot be found therefor. Macroblocks in B pictures are also preferably both temporally and spatially encoded. Unlike P pictures, each B picture has a reference picture which precedes the B picture and a reference picture which follows the B picture (in presentation order). A prediction macroblock can selectively originate in the preceding reference picture, the following reference picture or may be an interpolation of a prediction macroblock in the preceding reference picture and a prediction macroblock in the following reference picture. The reference picture(s) from which each prediction macroblock originates may be determined on a macroblock-by-macroblock basis. The reference pictures for B pictures are the immediately preceding I or P picture and the immediately following I or P picture, in presentation order. (Other, well known and more complex predictions may be available, such as dual prime, field prediction of frame pictures, 16×8 prediction, etc., depending on the encoding standard with which the encoding system 10 complies.) In designating picture coding types, the processor 12 may select a predetermined pattern, such as an I picture for the very first picture of the sequence and then alternating P and B pictures. As noted above, the designation of the reference picture is typically fixed by the encoding standard with which the encoding system 10 complies.

In step 108, the processor 12 divides the inputted picture into macroblocks. Typically, inputted video pictures include R (red), G (green) B (blue) pixel data which must be converted to Y (luminance), $C_r$ (red chrominance) and $C_b$ (blue chrominance) data. This can be achieved by a simple filtering operation. The luminance and chrominance data is then organized into macroblocks. For example, the macroblocks can include a 2×2 array of Y luminance blocks, one $C_r$ red chrominance block and one $C_b$ blue chrominance block, which $C_r$ and $C_b$ blocks have a lower sampling density than the Y blocks.

Steps 110–130 are then performed for each macroblock of each temporally encoded (P or B) picture. Each iteration is preferably completed for each macroblock, one at a time and in sequence before continuing to the next macroblock. In step 110, the processor 12 determines if there is another macroblock to be encoded for the current picture. If not, the processor 12 returns to step 102. If there is another macroblock to be processed, the processor 12 obtains the next macroblock (hereinafter referred to as the current macroblock) and performs a motion estimation thereon in step 112. Motion estimation may be performed using a block matching technique. However, only the luminance blocks Y are used in the motion estimation. Motion estimation can be achieved by extracting a search window of luminance pixel data from a reference picture that is spatially centered about the spatial coordinates of the current macroblock. (Preferably, the reference pictures have been previously encoded, decoded and stored in a picture buffer of the memory 14. This is so that predictions are formed using the same decoded pictures available at the decoder.) The processor 12 forms candidate prediction macroblocks identified by motion vectors at increments of ½ pixel row and column offsets and compares them to the current macroblock. This comparison is achieved by the processor 12 calculating the luminance mean absolute difference (MAD) for the current ($i^{th}$) macroblock as follows:

$$\sum_{x=1}^{j}\sum_{y=1}^{k}|P_i^Y[x,y]-MB_i^Y[x,y]|$$

where $P^Y_i$ is the luminance pixel data of a candidate prediction macroblock for the current $i^{th}$ macroblock, $MB^Y_i$ is the luminance pixel data of the current $i^{th}$ macroblock and j and k are the number of rows and columns of luminance pixel data in a macroblock, respectively. (This value may optionally be divided by j*k.) For 4:2:0 color format video, the luminance data Y of a macroblock is an array of 2×2 blocks of 8×8 luminance pixel data each and thus j=k=16. The candidate prediction macroblock with the smallest MAD is selected as the prediction macroblock and is identified by a motion vector having spatial offset coordinates and a temporal coordinate (indicating which reference picture from which the prediction macroblock originated). (Note, if an interpolated prediction is formed, two motion vectors are generated, namely, one for the prediction macroblock in the preceding reference picture and one for the macroblock in the following reference picture.)

In step 114, the processor 12 determines if the motion vector has zero spatial offset coordinates and if the luminance MAD generated for the prediction macroblock is below a first threshold. (Illustratively, this determination is made only when the prediction macroblock is selected from only a preceding reference picture. If the prediction macroblock is interpolated, or selected from a following reference picture, the processor 12 proceeds directly to step 122.) This would indicate that the luminance of the current macroblock of the current picture is nearly identical to the luminance of the prediction macroblock in the previous picture at the same spatial row and column coordinates. In such a case, it is possible that the current macroblock has not changed from the previous picture. This typically happens if the macroblock contains a portion of the image that is static. The first threshold is set fairly low, e.g., close to zero. Due to introduction of noise in the inputted video pictures, the first threshold is preferably greater than zero. If the motion vector has zero spatial coordinates and the luminance MAD is zero, the processor 12 executes step 116 through path A. If either the motion vector has nonzero spatial coordinates, or the luminance MAD is greater than or equal to the first threshold, or both, the processor 12 executes step 122 through path B.

Assume first that both the motion vector has zero spatial coordinates and that the luminance MAD is below the first threshold. In such a case, in step 116, the processor 12 generates the MAD for the chrominance of the current macroblock and the prediction macroblock by evaluating:

$$\sum_{x=1}^{a}\sum_{y=1}^{b}|P_i^{Cr}[x,y]-MB_i^{Cr}[x,y]|+\sum_{x=1}^{a}\sum_{y=1}^{b}|P_i^{Cb}[x,y]MB_i^{Cb}[x,y]|$$

where $P^{Cr}_i$ is the red chrominance pixel data of the prediction macroblock for the current $i^{th}$ macroblock, $MB^{Cr}_i$ is the red chrominance pixel data of the current $i^{th}$ macroblock, $P^{Cb}_i$ is the blue chrominance pixel data of the prediction macroblock for the current $i^{th}$ macroblock, $MB^{Cb}_i$ is the blue chrominance pixel data of the current $i^{th}$ macroblock and a and b are the number of rows and columns of red and blue chrominance pixel data in a macroblock, respectively. (This value may optionally be divided by 2*a*b.) For 4:2:0 color format video pictures, each macroblock has exactly one 8×8 block of $C_r$ red chrominance pixel data one 8×8 block of $C_b$ blue chrominance data and thus a=b=8. Then, in step 118, the processor 12 determines if the chrominance MAD is less than a second threshold. If so, this indicates that the current macroblock is basically unchanged from the previous picture and therefore can be skipped. Thus, if the chrominance MAD is less than a second threshold, the processor 12 skips the current macroblock in step 120 by inserting an indication into the bitstream that indicates that the macroblock is skipped. For example, each macroblock in the encoded bitstream may be preceded by a header in which is contained a macroblock address increment. The macroblock address increment indicates the increase of the address of the macroblock (the data of which immediately follows the header) in relation to the address of the macroblock which immediately precedes it in the bitstream. Macroblocks are preferably numbered sequentially. Thus, if the macroblock address increment is greater than one, then one or more intervening macroblocks have been skipped. Afterwards, the processor 12 executes step 110 via execution path C. If, in step 118, the processor 12 determines that the chrominance MAD is greater than or equal to the second threshold, the processor 12 executes step 122 via execution path B.

The processor 12 may have proceeded to step 122 from step 114 or 118. Either is an indication that the current macroblock is not substantially the same as the macroblock at the same coordinates in the previous picture. As such, the macroblock is encoded and placed in the encoded video bitstream. In step 122, the processor 12 forms the prediction error macroblock by subtracting the current macroblock from its prediction macroblock. Next, in step 124, the processor 12 discrete cosine transforms (a kind of orthogonal transform) each luminance and chrominance block of the prediction error macroblock. Next, in step 126, the processor 12 quantizes each transformed luminance and chrominance block of the macroblock. The quantizer scale factor is preferably varied to produce fewer or more bits per encoded macroblock in the encoded video bitstream. This may be done to ensure that the decoder buffer neither underflows nor overflows. In step 128, the processor 12 entropy encodes each quantized luminance and chrominance block of the prediction error macroblock data. The quantized data of each block may be scanned out into a sequence according to a zig-zag pattern. This tends to produce long runs of zeros separated by nonzero values. The entropy encoding may include (zero) run-level encoding followed by variable length encoding each run-level pair. In step 130, the processor 12 inserts the variable length encoded prediction error macroblock data into the bitstream. The processor 12 then returns to step 110 via execution path C.

According to the invention, the determination of whether or not to skip macroblocks is made before forming the prediction error macroblock, discrete cosine transforming, quantizing and entropy encoding, in steps 122, 124, 126 and 128. Prior art systems use discrete hardware for performing each of these steps and thus no savings would be achieved by their omission. However, the invention is particularly suitable for a processor implementation because processing intensive steps 122–128, in particular, step 124 which requires two floating point matrix multiplications on each block of the prediction error macroblock, are avoided for skipped macroblocks. A real time video conferencing application requires a very low latency, is not intended to have unpredictable scene cuts and will have a static background. Thus, many skipped macroblocks are anticipated each frame. The average saved time for skipped macroblocks can be allocated to other processing by the processor, such as increasing the search windows for motion vectors, better statistical allocation of bits per encoded macroblock, or other non-encoding processes performed by the processor. Thus, the invention provides a particular savings for processor encoding implementations.

The above discussion is merely illustrative of the invention. Those skilled in the art may devise numerous alternative embodiments without departing from the spirit and scope of the following claims.

The claimed invention is:

1. A method for encoding video pictures, each encoded picture being divided into non overlapping macroblocks, each macroblock comprising one or more luminance blocks and one or more chrominance blocks, each block comprising an n×m array of pixel data, said method comprising the steps of:

(a) obtaining a sequence of video pictures, (b) designating certain ones of the pictures of the sequence for predictive encoding and designating one or more of the pictures of the sequence as reference pictures for each picture designated for predictive encoding, (c) dividing a picture designated for predictive encoding into macroblocks, (d) iterating the following steps (e)–(n) once for each $i^{th}$ macroblock:

(e) motion estimating the $i^{th}$ macroblock, using only the luminance blocks of the $i^{th}$ macroblock, to obtain a motion vector, indicating the temporal and spatial offset from the $i^{th}$ macroblock to a prediction macroblock in a designated reference picture, and the mean absolute difference of the luminance blocks of the $i^{th}$ macroblock and the luminance pixels of the prediction macroblock, the mean absolute difference being computed by evaluating:

$$\sum_{x=l}^{j} \sum_{y=l}^{k} |P_i^Y[x, y] - MB_i^Y[x, y]|$$

where $P^Y_i$ is the luminance pixel data of the prediction macroblock for the $i^{th}$ macroblock, $MBY_i$ is the luminance pixel data of the $i^{th}$ macroblock and j and k are the number of rows and columns of luminance pixel data in a macroblock, respectively, (f) if the motion vector is zero and the mean absolute difference is below a first threshold then performing steps (g) and (h) for the $i^{th}$ macroblock, otherwise, performing, steps (j), (k), (l), (m) and (n), (g) generating the chrominance mean absolute difference between the chrominance blocks of the $i^{th}$ macroblock and the prediction macroblock, by evaluating:

$$\sum_{x=l}^{a} \sum_{y=l}^{b} |P_i^{Cr}[x, y] - MB_i^{Cr}[x, y]| + \sum_{x=l}^{a} \sum_{y=l}^{b} |P_i^{Cb}[x, y] - MB_i^{Cb}[x, y]|$$

where $P^{Cr}_i$ is the red chrominance pixel data of the prediction macroblock for the $i^{th}$ macroblock, $MB^{Cr}_i$ is the red chrominance pixel data of the $i^{th}$ macroblock, $P^{Cb}_i$ is the blue chrominance pixel data of the prediction macroblock for the $i^{th}$ macroblock, $MB^{Cb}_i$ is the blue chrominance pixel data of the $i^{th}$ macroblock and a and b are the number of rows and columns of red and blue chrominance pixel data in a macroblock, respectively, (h) if the chrominance mean absolute difference is less than a second threshold, then performing step (i), otherwise performing steps (i), (j), (k), (l), (m) and (n), (i) inserting an indication into the bitstream indicating that the $i^{th}$ macroblock is skipped, and refraining from performing steps (j), (k), (l), (m) and (n) for the $i^{th}$ macroblock, (j) subtracting the luminance and chrominance blocks of the $i^{th}$ macroblock from the prediction macroblock to form the prediction error macroblock for the $i^{th}$ macroblock, (k) orthogonally transforming each block of the prediction error macroblock for the $i^{th}$ macroblock, (l) quantizing each transformed block of the prediction error macroblock for the $i^{th}$ macroblock, (m) entropy encoding each quantized block of the prediction error macroblock for the $i^{th}$ macroblock and the motion vector, and (n) inserting the entropy encoded blocks of the prediction error macroblock and motion vector for the $i^{th}$ macroblock into the encoded bitstream wherein steps (j), (k), (l), (m) and (n) are not performed for the $i^{th}$ macroblock if step (i) is performed for the $i^{th}$ macroblock.

2. An apparatus for encoding video pictures, each encoded picture being divided into non overlapping macroblocks, each macroblock comprising one or more luminance blocks and one or more chrominance blocks, each block comprising an n×m array of pixel data, said method comprising the steps of:

(a) means for obtaining a sequence of video pictures, (b) means for designating certain ones of the pictures of the sequence for predictive encoding and designating one or more of the pictures of the sequence as reference pictures for each picture designated for predictive encoding, (c) dividing a picture designated for predictive encoding into macroblocks, (d) means for iterating the following steps (e)–(n) once for each $i^{th}$ macroblock:

(e) motion estimating the $i^{th}$ macroblock, using only the luminance blocks of the $i^{th}$ macroblock, to obtain a motion vector, indicating the temporal and spatial offset from the $i^{th}$ macroblock to a prediction macroblock in a designated reference picture, and the mean absolute difference of the luminance blocks of the $i^{th}$ macroblock and the luminance pixels of the prediction macroblock, the mean absolute difference being computed by evaluating:

$$\sum_{x=l}^{j} \sum_{y=l}^{k} |P_i^Y[x, y] - MB_i^Y[x, y]|$$

where $P^Y_i$ is the luminance pixel data of the prediction macroblock for the $i^{th}$ macroblock, $MB^Y_i$ is the luminance pixel data of the $i^{th}$ macroblock and j and k are the number of rows and columns of luminance pixel data in a macroblock, respectively, (f) if the motion vector is zero and the mean absolute difference is below a first threshold, performing steps (g) and (h) for the $i^{th}$ macroblock, and for otherwise, performing steps (j), (k), (l), (m) and (n), (g) generating the chrominance mean absolute difference between the chrominance blocks of the $i^{th}$ macroblock and the prediction macroblock, by evaluating:

$$\sum_{x=1}^{a}\sum_{y=1}^{b}|P_i^{Cr}[x,y]-MB_i^{Cr}[x,y]|+\sum_{x=1}^{a}\sum_{y=1}^{b}|P_i^{Cb}[x,y]-MB_i^{Cb}[x,y]|$$

where $P^{Cr}_i$ is the red chrominance pixel data of the prediction macroblock for the $i^{th}$ macroblock, $MB^{Cr}_i$ is the red chrominance pixel data of the $i^{th}$ macroblock, $P^{Cb}_i$ is the blue chrominance pixel data of the prediction macroblock for the $i^{th}$ macroblock, $MB^{Cb}_i$ is the blue chrominance pixel data of the $i^{th}$ macroblock and a and b are the number of rows and columns of red and blue chrominance pixel data in a macroblock, respectively, (h) if the chrominance mean absolute difference is less than a second threshold, then performing step (i), and for otherwise performing steps (j), (k), (m) and (n), (i) inserting an indication into the bitstream indicating that the $i^{th}$ macroblock is skipped, and refraining from performing steps (j), (k), (l), (m) and (n) for the $i^{th}$ macroblock, (j) subtracting the luminance and chrominance blocks of the $i^{th}$ macroblock from the prediction macroblock to form the prediction error macroblock for the $i^{th}$ macroblock, (k) orthogonally transforming each block of the prediction error macroblock for the $i^{th}$ macroblock, (l) quantizing each transformed block of the prediction error macroblock for the $i^{th}$ macroblock, (m) entropy encoding each quantized block of the prediction error macroblock and the motion vector for the $i^{th}$ macroblock, and (n) inserting the entropy encoded blocks of the prediction error macroblock and motion vector for the $i^{th}$ macroblock into the encoded bitstream, wherein said means for iterating refrains from performing steps (j), (k), (l), (m) and (n) for each $i^{th}$ macroblock for which step (i) is performed.

3. A method for temporally and spatially encoding each picture of a sequence of moving pictures comprising iterating, for each $i^{th}$ macroblock of a temporally encoded picture, in sequence, the steps of:

(a) motion estimating the $i^{th}$ macroblock, using only the luminance blocks of the $i^{th}$ macroblock, to obtain a motion vector, indicating the temporal and spatial offset from the $i^{th}$ macroblock to a prediction macroblock in a designated reference picture, and the mean absolute difference of the luminance blocks of the $i^{th}$ macroblock and the luminance pixels of the prediction macroblock, the mean absolute difference being computed by evaluating:

$$\sum_{x=1}^{j}\sum_{y=1}^{k}|P_i^{Y}[x,y]-MB_i^{Y}[x,y]|$$

where $P^Y_1$ is the luminance pixel data of the prediction macroblock for the $i^{th}$ macroblock, $MBY_i$ is the luminance pixel data of the $i^{th}$ macroblock and j and k are the number of rows and columns of luminance pixel data in a macroblock, respectively, (b) if the motion vector is zero and the mean absolute difference is below a first threshold then performing steps (c) and (d) for the $i^{th}$ macroblock, otherwise, performing step (f), (c) generating the chrominance mean absolute difference between the chrominance blocks of the $i^{th}$ macroblock and the prediction macroblock, by evaluating:

$$\sum_{x=1}^{a}\sum_{y=1}^{b}|P_i^{Cr}[x,y]-MB_i^{Cr}[x,y]|+\sum_{x=1}^{a}\sum_{y=1}^{b}|P_i^{Cb}[x,y]-MB_i^{Cb}[x,y]|$$

where $P^{Cr}_i$ is the red chrominance pixel data of the prediction macroblock for the $i^{th}$ macroblock, $MB^{Cr}_i$ is the red chrominance pixel data of the $i^{th}$ macroblock, $P^{Cb}_i$ is the blue chrominance pixel data of the prediction macroblock for the $i^{th}$ macroblock, $MB^{Cb}_i$ is the blue chrominance pixel data of the $i^{th}$ macroblock and a and b are the number of rows and columns of red and blue chrominance pixel data in a macroblock, respectively, (d) if the chrominance mean absolute difference is less than a second threshold, then performing step (e), otherwise performing step (f), (e) inserting an indication into the bitstream indicating that the $i^{th}$ macroblock is skipped, and refraining from performing step (f) for the $i^{th}$ macroblock, and (f) spatially encoding a prediction error macroblock formed from the prediction macroblock and the $i^{th}$ macroblock, wherein step (f) is not performed for the $i^{th}$ macroblock if step (c) is performed for the $i^{th}$ macroblock.

* * * * *